Jan. 25, 1938.　　L. A. FRAYER ET AL　　2,106,274
APPARATUS FOR CUTTING BAR STOCK
Filed Dec. 22, 1933　　6 Sheets-Sheet 5

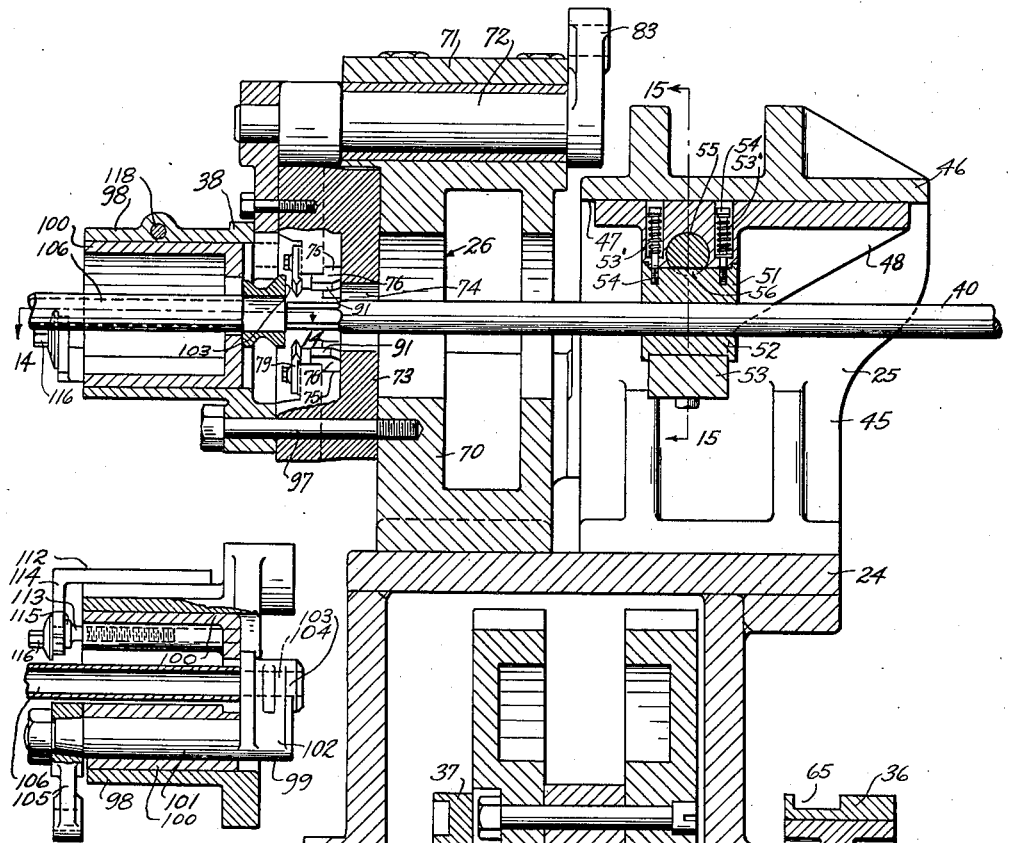
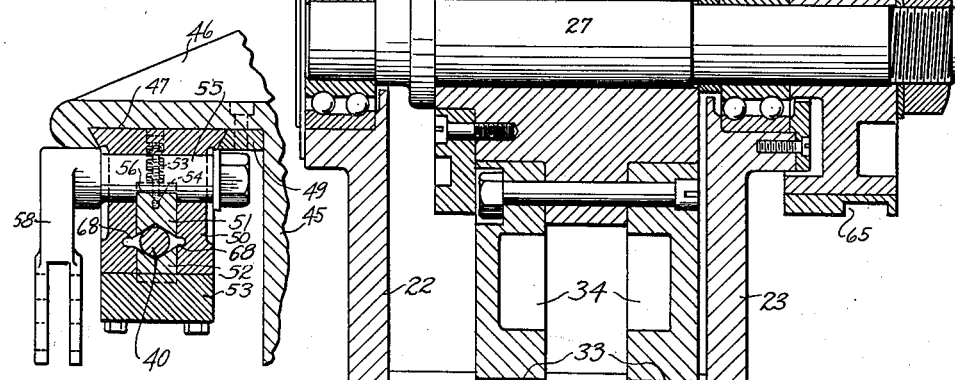

INVENTORS
LEE A. FRAYER
CARL L. HARVEY
Kwis, Hudson & Kent
ATTORNEYS

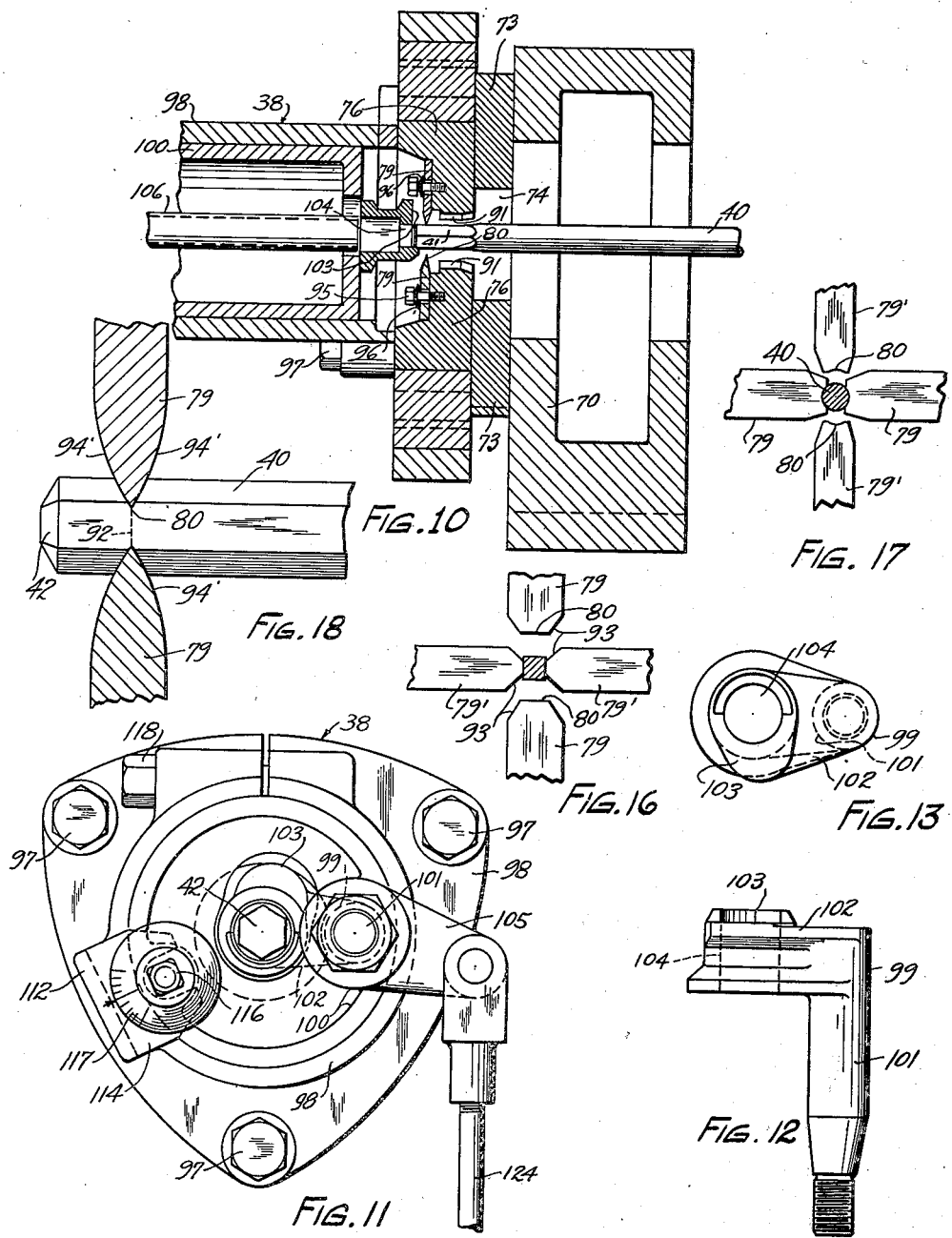

Patented Jan. 25, 1938

2,106,274

UNITED STATES PATENT OFFICE 2,106,274

APPARATUS FOR CUTTING BAR STOCK

Lee A. Frayer and Carl L. Harvey, Kent, Ohio, assignors to The Lamson & Sessions Company, Cleveland, Ohio, a corporation of Ohio Application December 22, 1933, Serial No. 703,536

11 Claims. (Cl. 164—57)

This invention relates generally to apparatus for cutting material into sections or relatively short lengths and, as one of its objects, aims to provide improved apparatus of this kind which is especially suitable for rapidly and economically cutting bars or lengths of stock into sections without crushing the material or distorting its shape.

Another object of this invention is to provide improved cutting apparatus, of the type mentioned, embodying an arrangement of cooperating cutters which are so constrained that the cutting edges lie in the same plane during the cutting operation.

Another object of this invention is to provide an improved cutting mechanism embodying a plurality of movable cutting elements arranged to form a contractible cutting means.

Still another object of this invention is to provide a cutting mechanism embodying an annular series of movable members having cutting edges in adjacent cooperating relation and constrained for movement of the cutting edges in substantially the same plane.

Another object of this invention is to provide a cutting mechanism embodying a substantially co-planar set of cooperating cutters adapted to be moved into cutting engagement with different portions of the perimeter of a bar of stock in a substantially dynamically balanced arrangement.

A further object of this invention is to provide a cutting mechanism embodying a plurality of substantially radially disposed movable cutters constituting a plurality of sets of complemental cutters, and wherein means is provided for moving said sets of cutters into engagement with the material to be cut.

It is also an object of this invention to provide improved cutting apparatus which embodies a cutting mechanism and novel means for feeding elongated stock to the cutting mechanism.

Yet another object of this invention is to provide improved cutting apparatus, embodying a cutting mechanism to which elongated stock material is adapted to be fed, and also embodying a novel stop mechanism for determining the length of sections to be cut from said stock.

Other objects and advantages of this invention will be apparent from the following description when taken in conjunction with the accompanying sheets of drawings, wherein Fig. 1 is a side elevational view of a cutting machine constructed according to our invention.

Fig. 4 is an elevation showing a length or bar of stock of the character adapted to be cut by our improved apparatus.

Fig. 5 is a side view showing a section cut from the length of stock.

Fig. 6 is a transverse section, on an enlarged scale, taken in the plane of a cut being made.

Fig. 7 is a longitudinal sectional view of our improved machine, taken substantially as indicated by line 7—7 of Fig. 2.

Fig. 10 is a partial sectional view taken as indicated by line 10—10 of Fig. 8.

Fig. 11 is an end view of the stop mechanism.

Fig. 12 is a detached view showing the stop member in elevation.

Fig. 13 is an end view of the stop member.

Fig. 14 is a partial sectional view of the stop mechanism as indicated by line 14—14 of Fig. 3.

Fig. 15 is a partial sectional view taken through the feeding mechanism, as indicated by line 15—15 of Fig. 7.

Figs. 16 and 17 are elevational views, somewhat diagrammatic in form, showing other arrangements for the cooperating cutting elements, and Fig. 18 is an elevational view, partly in section, showing a pair of the cooperating cutters of our invention acting upon a bar of stock.

Detailed reference will now be made to the accompanying drawings wherein we have illustrated our improved cutting apparatus which is especially suited for use in cutting elongated bars of stock and other material into desired sections, and especially relatively short sections, without crushing or otherwise distorting the material. The drawings illustrate what we now regard to be a practical embodiment of our invention, but it will be understood, of course, that the invention may be embodied in various other machines and arrangements of apparatus.

Before entering into a detailed description of our improved cutting apparatus it should be understood that, in general, our improved apparatus embodies a novel cutting mechanism, and also embodies novel means for feeding the material to the cutting mechanism, and a novel stop mechanism which cooperates with the feeding mechanism for determining the length of sections into which the material is to be cut. As will be explained more fully hereinafter, the feeding, cutting, and stop mechanisms are operated in timed relation, with the feeding and stop mechanisms cooperating to feed the stock to the cutting mechanism, preferably with a step by step movement. The cutting mechanism itself constitutes an important part of our invention and, as will appear more fully hereinafter, embodies an arrangement of cooperating or complemental cutting elements which are constrained for operation in the same plane and which constitute a convergent or contractible cutting means. The elements of this arrangement are adapted to be contracted into cutting relation with material being fed transversely of the plane in which the cutters are operated.

Figure 1:
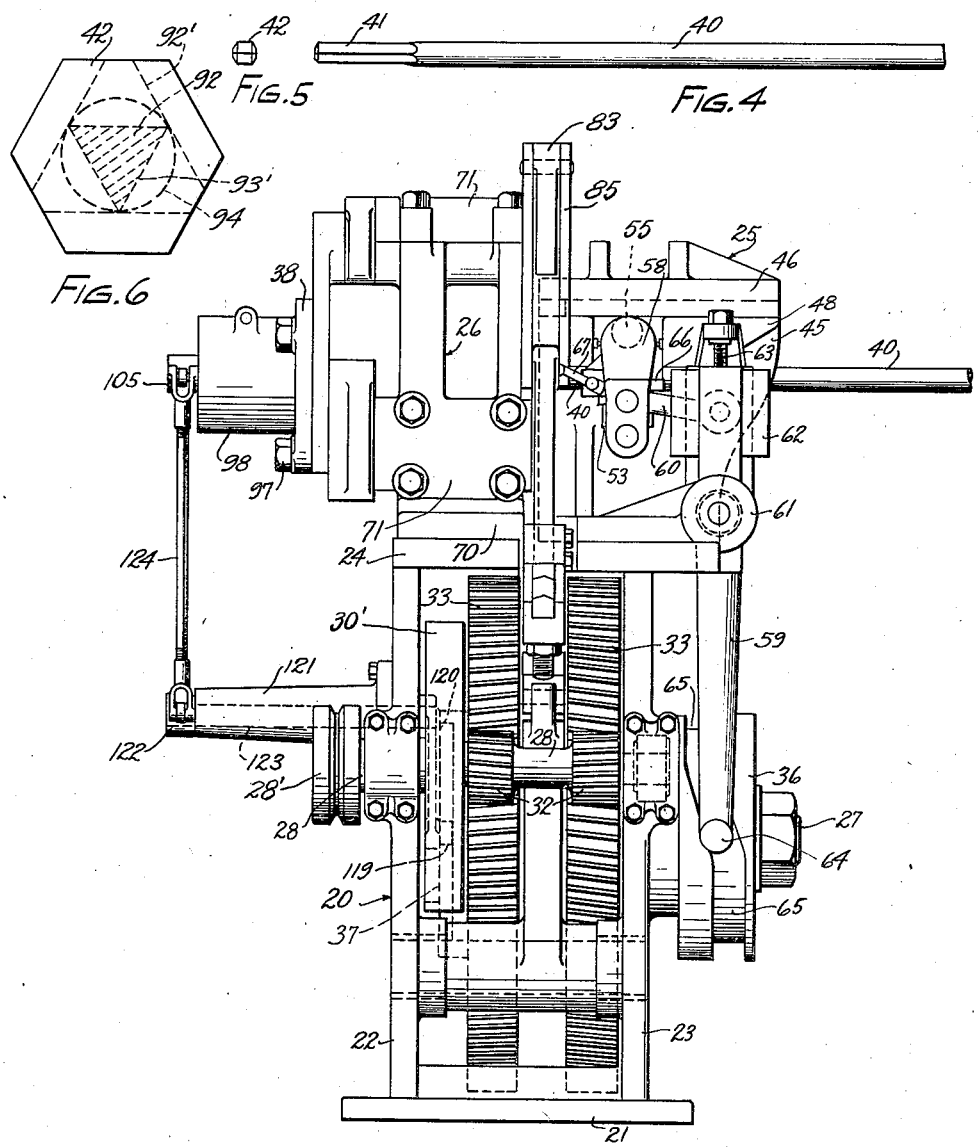
Figure 2:
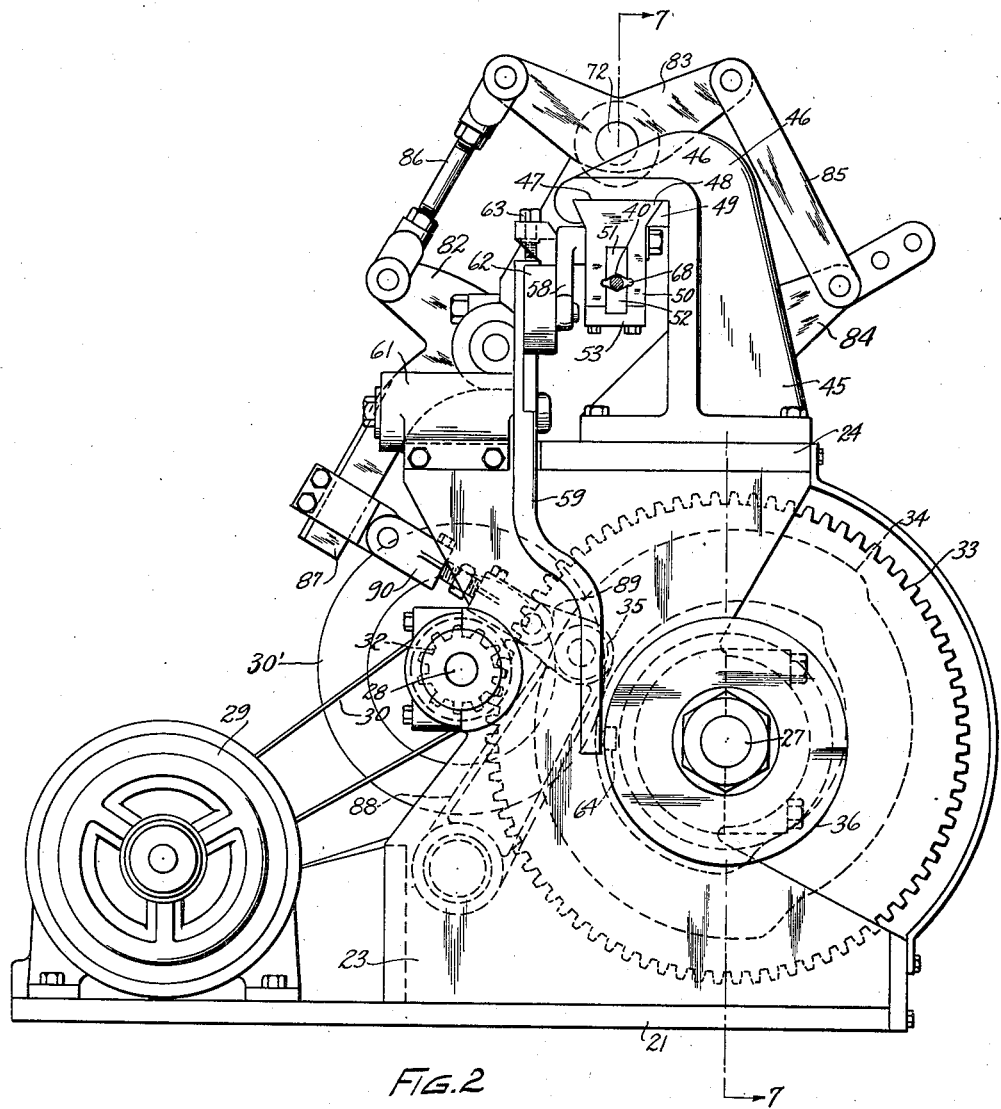
Fig. 2 is an end elevation of the machine showing the end thereof to which the material to be cut is supplied.
Figure 3:
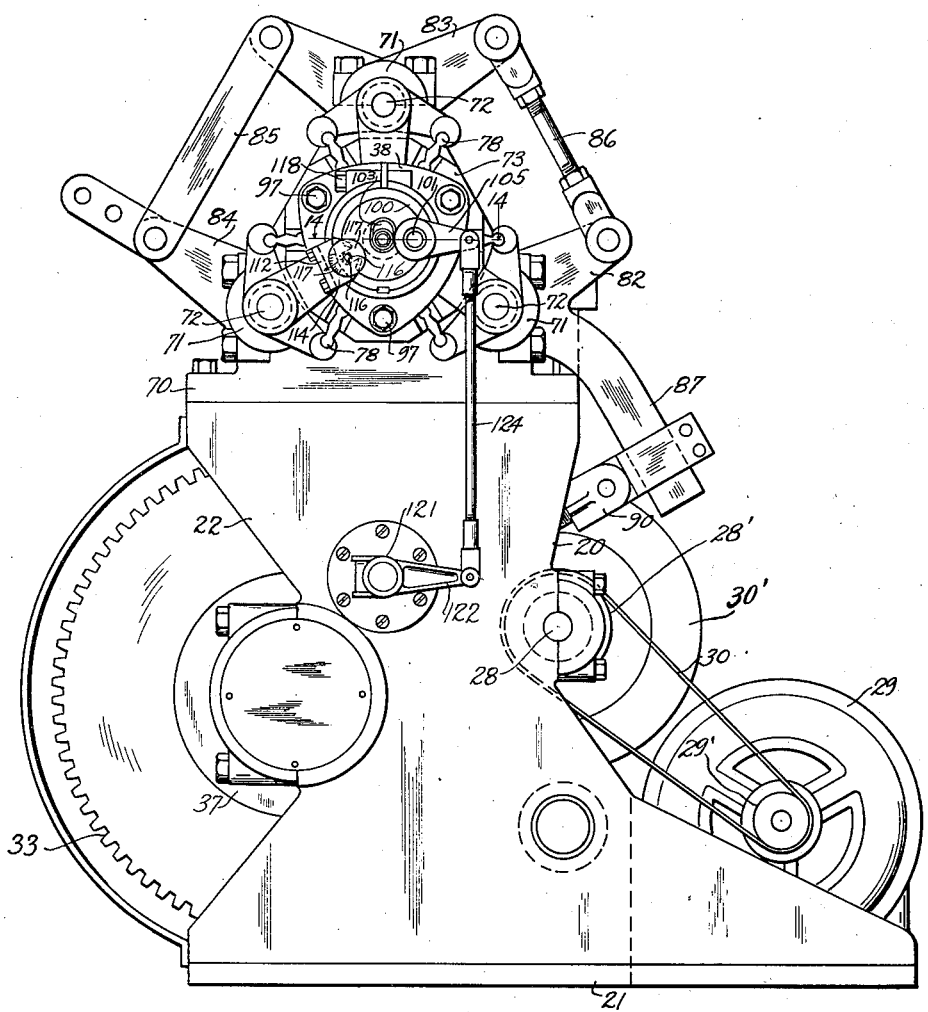
Fig. 3 is an end view of the machine showing the end thereof from which the sections, cut from the stock, are delivered.
Figure 9:
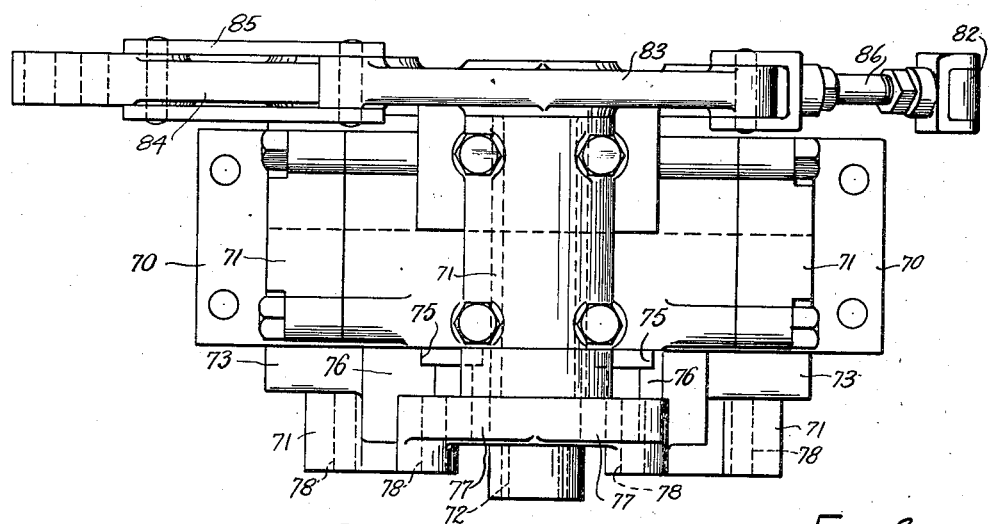
Fig. 9 is a top plan view of the cutting mechanism.

In Figs. 1, 2 and 3 of the drawings we have shown a machine which is constructed to embody the feeding and stop mechanisms, as well as the cutting mechanism. This machine may be provided with a suitable frame 20 having a base 21 to which a pair of spaced uprights 22 and 23 may be welded or otherwise suitably connected. A transverse member 24 may be welded or otherwise secured to the upper end of the uprights to provide a platform or support upon which the feeding mechanism 25 and the cutting mechanism 26 may be mounted. Although the frame of the machine is here shown as comprising members which have been welded or otherwise secured together it will be understood, of course, that a suitable frame of cast metal construction could also be employed.

For operating the various mechanisms in the desired timed relation, we may employ suitable power means including main and auxiliary shafts 27 and 28 which are supported by suitable bearings provided on the frame 20, and an electric motor 29 which may be mounted on the base 21, or in any other convenient location. The motor may be drivingly connected to the auxiliary shaft 28 by means of suitable pulleys 28' and 29' and a belt 30 extending therearound. The auxiliary shaft may be provided with a pair of spaced driving pinions 32 which cooperate with a pair of main gears 33, the latter being secured to the main shaft 27 and being disposed between the uprights 22 and 23 of the frame. If desired a suitable fly-wheel 30' may be provided on shaft 28.

As shown in Fig. 7 of the drawings, the main gears 33 may be constructed with cam grooves 34 in their adjacent faces in which a suitable cam follower 35 operates for supplying power to the cutting mechanism 26. A suitable cam 36 may be provided on the main shaft 27, outwardly of the upright 23, to supply power for actuating the feeding mechanism 25. Likewise, a suitable cam 37 may be provided on the main shaft 27, just inwardly of the upright 22, to supply power to the cut-off mechanism 38 which is located adjacent the cutting mechanism 26.

Although the cutting apparatus of our invention may be used in cutting various kinds of material into sections of desired length, it is especially suitable for cutting bar stock into relatively short sections. Heretofore it has been impossible to cut bar stock into short sections without crushing or distortion, except as a relatively slow and costly operation, but with our improved apparatus bar stock can be rapidly cut into short sections without such crushing or distortion so that blanks or sections of a desired regular form can now be economically cut from bar stock. For example, our improved apparatus may be used to cut bar stock into sections containing approximately the correct amount of metal for making various metal objects, such as nut blanks or the like.

In Fig. 4 of the drawings we have shown a bar of stock 40 which may be fed to the machine and which, in this instance, is of round cross section. As will be explained more fully hereinafter, our improved machine may embody means for converting the round stock to hexagonal, or other desired shape, prior to the cutting operation and, in Fig. 4 of the drawings, we have shown the leading end 41 of the bar 40 as having been converted to a rough hexagon shape by such means. Fig. 5 shows one of successive sections 42 which have been cut from the bar 40 to be used in the production of desired metal articles, and which in this instance are of appropriate size and shape to be used in forming nut blanks.

In Figs. 1 and 7 of the drawings, we show the bar 40 as being supplied to the cutting mechanism 26 by means of the feeding mechanism 25. For the sake of convenience we will first describe the detailed construction of the feeding mechanism.

As best shown in Figs. 1, 2 and 7 of the drawings, the feeding mechanism includes a bracket-like member 45 which may be mounted upon the supporting member 24 and which is provided with a head portion 46 having an undercut guideway 47 therein. This guideway is arranged to extend toward the cutting mechanism 26, or in other words, in the direction in which the stock 40 is desired to be fed. A slide 48 is mounted in the guideway 47 for reciprocable movement therein and may be retained in the guideway by means of a suitable gib 49.

The slide 48 is preferably constructed with a pair of depending sides or cheeks 50 which are in spaced substantially parallel relation. A pair of complemental gripping blocks or dies 51 and 52 may be arranged in the space between the cheeks 50 and may be retained therein by means of the cap 53. The blocks 51 and 52 are constructed with suitable grooves or recesses in their adjacent faces for gripping engagement with the bar 40. The upper block 51 is normally lifted or moved away from the lower block 52 by means of coil springs 53' acting on studs 54 which are mounted in the upper block and extend into recesses in the slide 48. These coil springs tend to move the block 51 away from the block 52 or, in other words, in a direction to release the gripping engagement on the bar 40.

Various means may be provided for operating the gripping blocks 51 and 52 and for reciprocating the slide 48 but, in this instance, we have provided common actuating means for these two functions. This actuating means includes a rock shaft 55 which is journaled for oscillation in the slide 48 just above the cooperating blocks 51 and 52, as shown in Figs. 7 and 15. The portion of this shaft which lies immediately above the block 51 is notched out, as indicated at 56, for a distance slightly greater than the width of the block so that this portion of the shaft will act as a cam for pressing the block 51 toward the block 52 as the shaft is oscillated.

The shaft 55 may be provided with a lever portion 58, the lower end of which is connected to an actuating lever 59 by means of a link 60. The actuating lever 59 may be pivoted on the frame 20 by means of a bearing 61, as shown in Figs. 1 and 2, and at its upper end is provided with a vertically adjustable block 62 to which the link 60 is pivotally connected. The block 62 may be adjusted up or down on the lever 59 by means of the adjusting screw 63 to thereby vary the extent of angular movement imparted to the lever 58 and to the rock shaft 55. The lower end of the actuating lever 59 is provided with a suitable cam follower 64 which engages in the cam groove 65 of the cam 36.

From the arrangement of feeding mechanism just described it will be seen that as the cam 36 is rotated by the main shaft 27, the lever 59 will be rocked in the bearing 61 and such rocking movement will cause a rocking movement to be imparted to the shaft 55 through the link 60 and the lever portion 58. The first part of such rocking movement imparted to the shaft 55 will cause the cut-out portion 56 of this shaft to act on the block 51 in the manner of a cam, thereby causing this block to cooperate with the block 52 in gripping the bar 40. The gripping of the bar by the blocks 51 and 52 limits the extent of angular movement of the shaft 55, and thereafter the force transmitted through the link 60 causes the slide 48 to be moved along the guideway 47 to feed the rod 40 toward the cutting mechanism 26. When the lever 59 is rocked by the cam 36 in the direction to retract the slide 48, the link 60 causes the arm portion 58 to engage a stop 66 which is provided on the slide. The engagement of the arm portion with the stop 66 limits further rotation of the shaft 55 and prevents the block 51 from being moved into gripping engagement with the bar 40 while the slide is being retracted.

If it is desired to have the machine operate without the bar 40 being advanced or fed to the cutting mechanism, the slide 48 may be provided with a control member 67 which is pivotally mounted on the slide adjacent the arm portion 58, as shown in Fig. 1 of the drawings. The control member 67 is so arranged that it may be swung in a position to lock the arm portion against movement relative to the slide so that rocking of the lever 59 will simply cause the slide 48 to move back and forth in the guideway 47 without the blocks 51 and 52 exercising any gripping action on the bar 40.

If desired the adjacent faces of the cheeks 50 of the slide 48 may be provided with grooves 68 opposite the gripping portions of the blocks 51 and 52. These grooves permit the escape of scale, dirt or other foreign material which may have been carried into the feeding mchanism with the stock.

Figure 8:
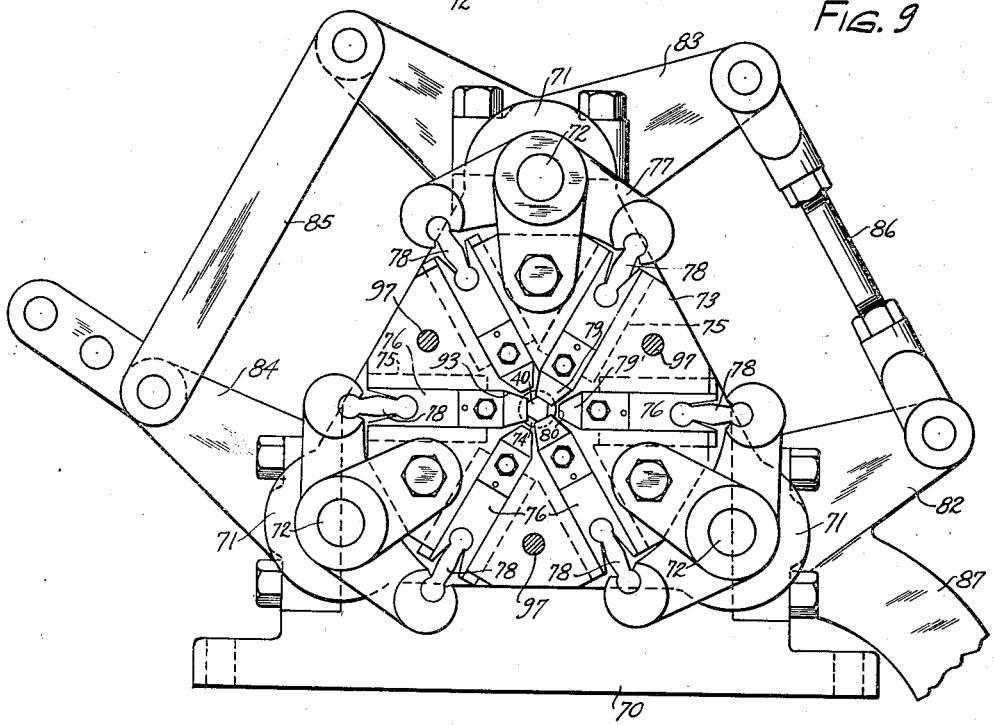
Fig. 8 is an end view of the cutting mechanism showing the same detached from the machine assembly.

The cutting mechanism will next be described in detail and, as shown in Figs. 1, 3 and 7 of the drawings, this mechanism may be in the form of an assembly or unit which is mounted on the support 24 adjacent the feeding mechanism 25. The cutting mechanism is provided with a suitable supporting structure or frame 70 having a plurality of bearings 71 in which are mounted rock shafts 72. The support 70 may be of hollow construction to reduce its weight and also to accommodate the passage of the bar of stock 40 therethrough as shown in Fig. 7. A part 73, which may be referred to as a guide plate, is secured to the support 70 at one side thereof so as to lie in a plane which is substantially at right angles to the direction of feed of the bar 40. The guide plate is provided with a central opening 74 through which the bar of stock may be fed and is also provided with a plurality of guide slots 75 which are arranged in an annular series and preferably extend substantially radially with respect to the opening 74. A slide 76 is reciprocably mounted in each of the guide slots for movement toward or away from the opening 74. In this instance, as shown in Fig. 8 of the drawings, the plate 73 is provided with six of the guide slots 75 and likewise with a corresponding number of slides 76. The bearings 71 of the guide plate are located substantially midway between pairs of guide slots so that movement may be imparted from each rock shaft 72 to a pair of slides 76 through suitable lever arms 77 and connecting links 78.

A cutter is secured to each slide 76 adjacent its inner end and each such cutter is provided with a convergently tapered cutting edge 80. In the arrangement illustrated, the cutters carried by the annular series of slides 76 constitute a plurality of sets, preferably, though not necessarily, two sets with alternate cutters 79 of the series forming one set, and the intermediate cutters 79' of the series forming the other set. The guide slots 75 serve to constrain the slides 76 during their movement toward and away from the opening 74 so that the cutting edges 80 always lie in substantially the same plane during their opening and closing movements. The slides and the cutters are so arranged relative to the guide plate that all of the cutting edges 80 operate in a transverse plane which is disposed substantially at right angles to the direction of feed of the bar 40. Each set of cutters thus constitutes a contractible cutting means, the cutters 79 of one set being moved into cutting engagement with the bar of stock, at spaced points around its perimeter, by rocking of the shafts 72 in one direction and the other set of cutters 79' being moved into cutting engagement with the bar of stock, at the intermediate points of its perimeter, by rocking the shafts 72 in the opposite direction. From the arrangement illustrated it will be seen that the first set of cutters is retracted or moved away from the bar of stock during the time that the second set of cutters is being moved into engagement with the stock.

Any suitable means may be provided for rocking the shafts 72 to actuate the slides and, in this instance, we show suitable levers 82, 83 and 84 which are keyed or otherwise connected to the shafts 72. The lever 83 may be a bell crank lever with one arm thereof connected to the lever 84 by means of a link 85, and the other arm connected to the lever 82 by means of a link 86 which is preferably adjustable as to length. The lever 82 may be provided with an extension 87 to which power may be supplied for actuating the cutting mechanism.

Power for the actuation of the cutting mechanism may be supplied from the cam grooves 34 of the main gears 33 to the extension 87 by any suitable linkage arrangement and, in this instance, we show the cam follower 35 as being carried by a lever 88 which is pivoted on the frame 20 and which is connected to the extension 87 by means of the pivoted link 89 and the link 90, the latter link preferably being adjustable as to length.

In the cutting mechanism, as illustrated in Fig. 8 of the drawings, we have shown the annular series of cutters as comprising six cutters or, in other words, two sets comprising three cutters each. It is not at all necessary to our invention that this particular number of cutters be employed since any number may be used which is best suited to the requirements of the work being performed. If desired, an arrangement of four cutters may be employed, as shown in Figs. 16 and 17. Likewise, a series or set of cutters may be used which contains an uneven number of cutters, such as when five or seven sided bar stock is to be cut, and if desired where a plurality of sets of cutters is employed, one set may contain more cutters than the other set or sets.

It is usually desirable that the cutters, constituting a set, be disposed in a dynamically balanced arrangement so that when such set of cutters is moved into engagement with the bar of stock there will be no unbalanced forces tending to bend the bar or cause undesirable vibration. Thus, when the set of three cutters 79 of Fig. 8, or the set of two cutters 79 of Fig. 16, is is moved into engagement with the bar, the forces applied to the cutters oppose or neutralize each other so that at no time during the cutting operation is there any resultant force tending to cause transverse displacement or bending of the bar. Hence, the dynamically balanced arrangement of cutters produces a clean cut with the minimum required force and with a minimum of distortion or vibration.

When the cutters are operated in sets, as explained above in connection with Fig. 8, the first set of three cutters is contracted around the bar of stock thereby moving the corresponding three cutting edges into engagement with spaced portions of the perimeter of the bar. After these three cutting edges have been forced into the bar the desired distance, they are retracted and at the same time the other set of three cutters is contracted around the bar to move the corresponding three cutting edges into engagement with the intermediate portions of the perimeter of the bar. Similarly, after the second set of cutters has been forced into the bar the desired distance they may be retracted and both sets of cutters may thereby be positioned to permit the bar of stock to be fed past the cutting edges preparatory to the next cutting operation.

As mentioned above, the cutting mechanism may also embody means for changing the cross sectional shape of the bar of stock and, if desired, this means may be in the form of cooperating swaging dies 91 which are carried by the slides 76 at the inner end thereof adjacent the cutters. The cooperating swaging dies may be associated with one or both of the sets of complemental cutters and are so shaped and arranged that they will act on the leading end of the bar 40 to change the shape thereof from round to a desired polygonal shape such as the hexagonal leading end portion 41 shown in Fig. 4. Since the swaging dies are carried by the slides 76 it will be seen that these swaging dies are operated at the same times that the cutters are operated, so that the sections 42 are cut from the leading end of the bar of stock immediately after the same has been swaged to the desired cross sectional shape.

In the operation of the cutting mechanism it is not necessary that the cooperating cutters be forced into the bar far enough to bring the cutting edges into meeting relation, but the section is preferably severed from the leading end of the bar partly by cutting and partly by breaking, the breaking occurring after the cutting has sufficiently reduced the area of metal which joins the section with the bar. This broken area is represented at 92 in Fig. 6.

To permit the cutting edges 80 of the cutters to be forced into the bar of stock the desired extent without interference between adjacent cutters, the edges of the cutters may be chamfered or beveled as indicated at 93 in Fig. 8. The angle of the bevel may be of any suitable value depending upon the number and arrangement of the cutters in the series. When sections or blanks of hexagonal shape, such as the sections 42 of Figs. 5 and 6, are to be produced, it is usually desirable that the series of cutters be composed of six cutters, as shown in Fig. 8, because with this arrangement one cutter is available to act on each face of the hexagon portion 41 of the bar. If the stock to be cut is square, it may be desirable to employ a series containing four cutters as shown in Fig. 16, and if the stock to be cut is round, the edges of the cutters of the series may be concave as shown in Fig. 17.

To prevent crushing of the metal of the bar of stock during the cutting operation, it is usually desirable that the cutters of the set which acts on the bar first, for example the cutters 79 of Fig. 8, have cutting edges of a width somewhat greater than the longest transverse axis of the bar. The cutters of the second set to act on the bar, such as the cutters 79' of Fig. 8, need not be as wide as the cutters 79 because when the second set acts on the bar the cross section to be cut has already been reduced in area by the operation of the first set. This is illustrated in the enlarged cross sectional view of Fig. 6, wherein the dotted lines 92' represent the extent to which the cutters 79 are forced into the bar and the dotted lines 93' represent the extent to which the cutters 79' are forced into the bar.

In Fig. 18 of the drawings we have illustrated somewhat in diagrammatic form, a pair of the cooperating cutters 79 or 79' in the act of cutting a section 42 from the bar 40. As illustrated in this diagram, the cutting edges 80 lie in the same plane as they are being moved toward each other and forced into the bar. While the cross sectional shape of the cutters may be varied to suit different characteristics of the material being cut, we find that best results are obtained when these cutters are chisel-like and formed with their opposite side faces 94' convergently tapered, as shown in Fig. 18, so that the cross sectional shape of the cutters resembles an ogive. When the cutters are constructed in this shape they tend to wedge the section 42, which is being severed from the bar, away from the bar itself and, when the wedging action thus exerted on the section, exceeds the tensile strength of the area of material 92 joining the section with the bar, the section is then broken away from the bar. This is desirable in the operation of the cutting mechanism because it avoids the need of having the cutting edges 80 come into engagement with each other, which would result in breakage of the apparatus or dulling of the cutting edges. Moreover, the ogival shape of the cutters produces a clean cut with minimum crushing or distortion of the material, and the breaking of the sections away from the bar of stock causes the sections to be ejected from the cutting mechanism, as will be explained hereinafter.

With the cutters arranged and operated in the manner already explained, it will be observed from Fig. 6 that the broken area 92 is relatively small and that this area is disposed centrally of the cross section. When the sections 42, which have been cut from the bar, are to be used in forming certain metal articles, such as nut blanks, the location and size of this area is of importance because if this area is small and is disposed centrally of the section, the subsequent forming of the tap opening in the body, indicated by the dotted circle 94 in Fig. 6, will remove this portion. If the size and location of the broken area is not such that this area is removed from the body, the different surface characteristics of the cut and broken portions of the stock will be noticeable in the finished article, and this is undesirable from the standpoint of the appearance of the finished articles if for no other reason.

When the cutting mechanism is constructed to embody the cooperating swaging dies 91, as well as the cooperating cutters 79 and 79', it is usually desirable that provision be made for slight relative movement between the cooperating cutters and swaging dies in the direction of the axis of the bar of stock. In the present arrangement provision is made for this slight relative movement, as shown in Fig. 10, by mounting the cutters on the respective slides 76 by means of studs 95 which extend through the cutters but which do not clamp the cutters against the slides. A spring washer 96 is provided on each of the studs between the cutter and the head of the stud so that a flexing of the washer will permit a slight lateral shifting of the cutter relative to the slide or, in other words, relative to the swaging die which is carried by the slide. The spring washers 96 normally hold the cutters against the slides 76 so that the cutting edges will all lie in the same transverse plane but, during the cutting operation, the spring washers will yield slightly to allow a limited shifting of the plane of the cooperating cutters as the cutters are forced into the bar of stock.

For determining the length of section to be cut from the leading end of the bar of stock, we provide the stop mechanism 38 which, as mentioned above, is located adjacent the cutting mechanism. As best shown in Figs. 1, 3 and 7 of the drawings, the stop mechanism 38 may be mounted on the support 70 of the cutting mechanism by being bolted against the guide plate 73 by means of suitable screws 97. In this instance the stop mechanism comprises a support 98 which is held against the guide plate 73 by means of the screws 97, and a stop member 99 which is mounted on the support for movement transversely of the axis of feed of the bar 40. The support 98 is hollow and is preferably constructed in the form of a clamping sleeve, as shown in Figs. 3 and 11, so that a bearing member 100 may be adjustably held therein. The stop member 99 is provided with a shaft portion 101, which is journaled for oscillation in the bearing member 100, and with an arm portion 102 which extends transversely of the axis of the bar 40. This arm portion is provided with an abutment surface 103 which is adapted to be moved into the path of the leading end of the bar 40 and with an opening 104 adjacent to such abutment surface. At the outer end of the shaft portion 101, the member 99 may be provided with an actuating lever 105 for causing oscillation of the shaft portion and corresponding swinging movement of the arm portion 102. A tubular member 106 extends into the bearing member 100 and may be suitably supported with its open inner end adjacent the arm portion 102 of the stop member 99, as seen in Figs. 7 and 14 of the drawings.

From the arrangement just described it will be seen that when the stop member 99 is rocked by oscillation of the shaft portion 101 in the bearing member 100, the arm portion 102 may be moved to position the abutment surface 103 in the path of feed, so that as the bar 40 is advanced by movement of the slide 48, the leading end of the bar engages the abutment surface 103. This abutment surface thus forms a stop which limits the advance movement of the bar 40 and determines the length of section which is to be cut by the cooperating cutters. After the bar of stock has been positioned by the abutment surface 103, the shaft 101 is rocked to move the abutment surface out of the path of feed and to position the opening 104 in alignment with the tube 106 and with the leading end of the bar of stock. When the section 42 is cut from the end of the bar of stock by the cutters the breaking of the area 92 connecting the section with the bar completes the severing operation, as explained above, and causes the section to snap away from the bar of stock and to be projected through the opening 104 into the tube 106. The tube may be suitably arranged to conduct the sections away from the cutting mechanism to a place of storage or to a machine for forming nut blanks or other metal articles from such sections.

In order to be able to vary the length of the sections being cut from the bar 40, we provide means for adjusting the position of the stop member 99 relative to the cooperating cutters. While various forms of adjusting means may be provided, in this instance we show an anchor bracket 112 which is secured to the supporting member 98 and which cooperates with an adjusting screw 113 for moving the bearing member 100, and the stop member 99 carried thereby, in or out with respect to the plane of the cooperating cutters. If desired, the anchor bracket 112 may be provided with a forked end 114, as shown in Figs. 11 and 14, and the adjusting screw 113 may be provided with a shouldered portion 115 which cooperates with the forked end in such a manner that the screw can be rotated by the application of a wrench or other tool to the squared end 116, but the screw is held against axial movement by the bracket. Since the screw 113 is threaded into the bearing member 100 and axial movement of the screw itself is prevented, it will be seen that by rotating the screw the bearing member may be slid in or out within the supporting member 98. When the desired adjustment of the stop member has been obtained, as may be indicated by suitable graduations 117 on the adjusting screw 113, the supporting member or sleeve 98 may be clamped around the bearing member 100 by means of the clamping screw 118.

As already stated, the stop member 99 is actuated by the shaft 101 being oscillated by means of the actuating lever 105, and any suitable means may be employed for imparting motion to this actuating lever. In the present arrangement of apparatus the lever 105 is actuated from the cam 37 and, if desired, motion may be transmitted from the cam to the lever by means of the cam follower 119 and any suitable arrangement of connecting linkage. In this instance the cam follower is carried by a lever 120 which is pivotally mounted in a bracket 121, the latter being mounted on the upright 22 of the frame. A lever 122 may be attached to the outer end of the shaft 123 of the pivotally mounted lever 120 and may be connected to the actuating lever 105 of the stop mechanism by means of a connecting link 124 which is preferably adjustable as to length.

From the arrangement of apparatus illustrated and described, it will now be seen that a bar of stock can be fed to the cutting mechanism with a step by step movement by means of the feeding mechanism, and that the length of sections to be cut from the leading end of the bar of stock may be determined by means of the stop mechanism. Just in advance of the cooperating cutters the bar of stock may be subjected to a swaging operation to change the cross sectional shape of the bar to correspond roughly with the cross sectional shape desired in the sections which are cut from the bar. It will also be seen that by reason of the construction of the stop mechanism and the cross sectional shape of the cooperating cutters, the sections which are cut from the leading end of the bar of stock are projected or snapped through the stop member and into a tube or other conveying means which conducts the sections away from the cutting mechanism. It will also be seen that by reason of the fact that the feeding mechanism, cutting mechanism and stop mechanism are all actuated from the main shaft these mechanisms will be operated in a desired timed relation for the rapid and economical cutting of the desired sections or blanks from elongated stock.

As already stated, the cutting mechanism itself constitutes an important part of our invention and, from the foregoing description, it will now be understood that the cooperating complemental cutters are constrained so that their cutting edges operate in substantially the same plane. Moreover, it will be understood that because of the cross sectional shape of the cutters, and the arrangement of the cutters to constitute a contractible cutting means wherein the cutting edges engage different portions of the perimeter of the bar, our cutting mechanism can be used to cut very short sections from bar stock and the cutting operations will be performed with a clean cut and with little or no crushing or distortion of the material.

While we have illustrated and described the apparatus of our invention in a detailed manner, it will be understood, of course, that we do not wish to be limited to the precise details of construction and arrangements of parts illustrated and described, but regard our invention as including such changes and modifications as do not involve a departure from the spirit of the invention and the scope of the appended claims.

Having thus described our invention, we claim:

1. In a cutting mechanism the combination of a support, an annular series of substantially radially movable cutters, alternate cutters of said series constituting one set and the intermediate cutters constituting another set, a plurality of rocker arms on said support, means connecting the cutters of said one set with corresponding ends of the respective rocker arms and the cutters of the other set with the opposite ends of the respective rocker arms, and means for moving said rocker arms in one direction to cause converging of the cutters of one set and in the opposite direction to cause converging of the cutters of the other set to thereby actuate said sets of cutters.

2. In apparatus of the character described the combination of means for feeding a length of stock, means for cutting a section from the leading end of said length of stock, and means movable into the path of feed and adapted to be engaged by said leading end for determining the length of section to be cut, said movable means having an opening therethrough for the passage of the section which is cut from the length of stock.

3. In apparatus of the character described the combination of a plurality of cooperating movable cutters, means for feeding a length of stock transversely of said cutters, a stop movable into the path of feed and adapted to be engaged by the leading end of the stock to determine the length of section to be cut, means for actuating said cutters, said stop having an opening therethrough for the passage of the section cut from said stock, and means for moving said stop into the path of feed and for subsequently moving the stop to position said opening to receive said section.

4. In apparatus of the character described the combination of a plurality of cooperating movable cutters, means for feeding a length of stock transversely of said cutters, a stop movable into the path of feed and adapted to be engaged by the leading end of the stock to determine the length of section to be cut, said stop having an opening therethrough for the passage of the section cut from said stock, and means for actuating the cutters, said cutters being shaped to cause said section to be moved through said opening.

5. In apparatus of the character described the combination of means for cutting sections from a length of stock being fed, and stop means adjacent the cutting means for determining the length of sections to be cut, said stop means comprising a support, a member mounted on said support for movement transversely of the axis of the stock being fed, said member having an abutment portion adapted to be engaged by the stock being fed and an opening therethrough adjacent said abutment portion for the passage of sections cut from the stock, and means for moving said member to successively position said abutment portion and said opening in substantial alignment with the stock being fed.

6. In apparatus of the character described the combination of means for cutting sections from a length of stock being fed, and stop means adjacent the cutting means for determining the length of sections to be cut, said stop means comprising a support, a member mounted on said support for movement transversely of the axis of the stock being fed, said member having an abutment portion adapted to be engaged by the stock being fed and an opening therethrough adjacent said abutment portion for the passage of sections cut from the stock, means for moving said member to successively position said abutment portion and said opening in substantial alignment with the stock being fed, and means for adjusting said movable member relative to said cutting means for varying the length of section to be cut.

7. In apparatus for feeding stock the combination of a reciprocable support, a pair of cooperating members carried by said support and adapted to releasably grip said stock, an oscillatable part on said support adapted to cause said members to grip said stock, and common means for actuating said oscillatable part and moving said support, the last mentioned means being ineffective for moving said support until said oscillatable part has been actuated.

8. In apparatus of the character described the combination of a supporting member having an opening therethrough, means on one side of said member adapted to cooperate with a length of stock for feeding the same through said opening, a cutting mechanism on the other side of said member including a plurality of cooperating cutters operable in a plane which extends substantially normal to the axis of said length of stock for cutting sections from the leading end of said stock, and means adjacent said cutting mechanism for determining the length of sections to be cut including a member having an abutment portion and an opening therethrough adjacent the abutment portion, said member being movable to bring said abutment portion into position to be engaged by the stock being fed and to subsequently bring said opening into position for the discharge therethrough of the section cut from the stock.

9. In apparatus of the character described the combination of a support, means adjacent said support for feeding a bar of stock in the direction of its axis, a hollow part on said support with its axis extending in substantial alignment with the axis of feed, cutting means operable for cutting successive sections from the leading end of the bar being fed, a feed stop having an abutment part and an opening, said stop being movable to successively position the abutment part and opening in substantial alignment with the bar being fed, and means adjustably held by said hollow part and providing a mount for said feed stop.

10. In apparatus of the character described the combination of a support, means adjacent said support for feeding a bar of stock in the direction of its axis, a clamping sleeve on said support with its axis extending in substantial alignment with the axis of feed, cutting means operable for cutting succecssive sections from the leading end of the bar being fed, a feed stop having an abutment part and an opening, said stop being movable to successively position the abutment part and opening in substantial alignment with the bar being fed, and means adjustably held by said clamping sleeve and providing a mount for said feed stop.

11. In apparatus of the character described the combination of a support, means adjacent said support for feeding a bar of stock in the direction of its axis, cutting means operable for cutting successive sections from the leading end of the bar being fed, a feed stop comprising an arm having an abutment part and an opening adjacent thereto, and means pivotally mounting said arm for swinging movement to successively position said abutment part and opening in substantial alignment with the bar being fed.

LEE A. FRAYER.
CARL L. HARVEY.